No. 741,642. PATENTED OCT. 20, 1903.
J. W. EVANS.
HARVESTER OR MOWER SICKLE KNIFE.
APPLICATION FILED APR. 9, 1903.
NO MODEL.
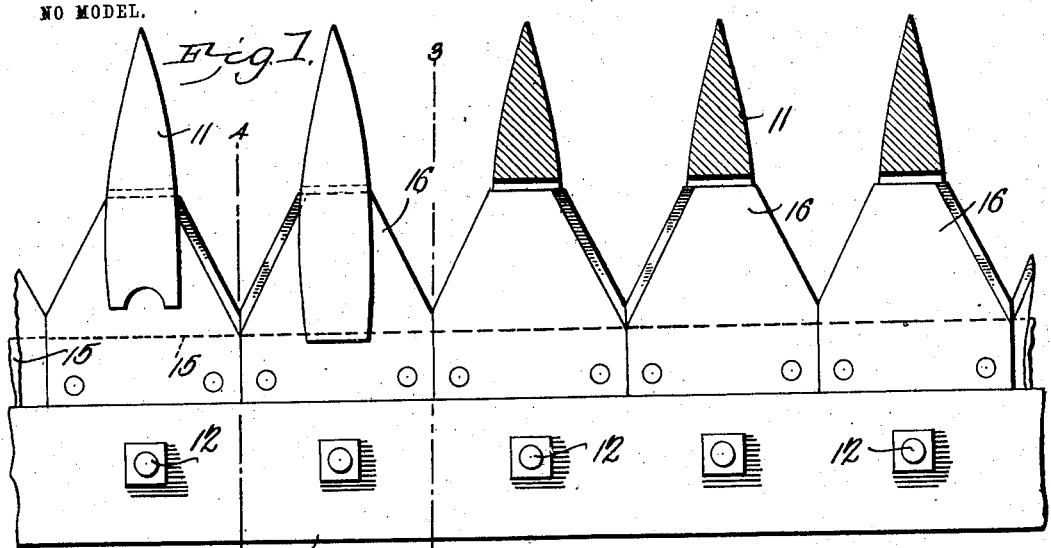
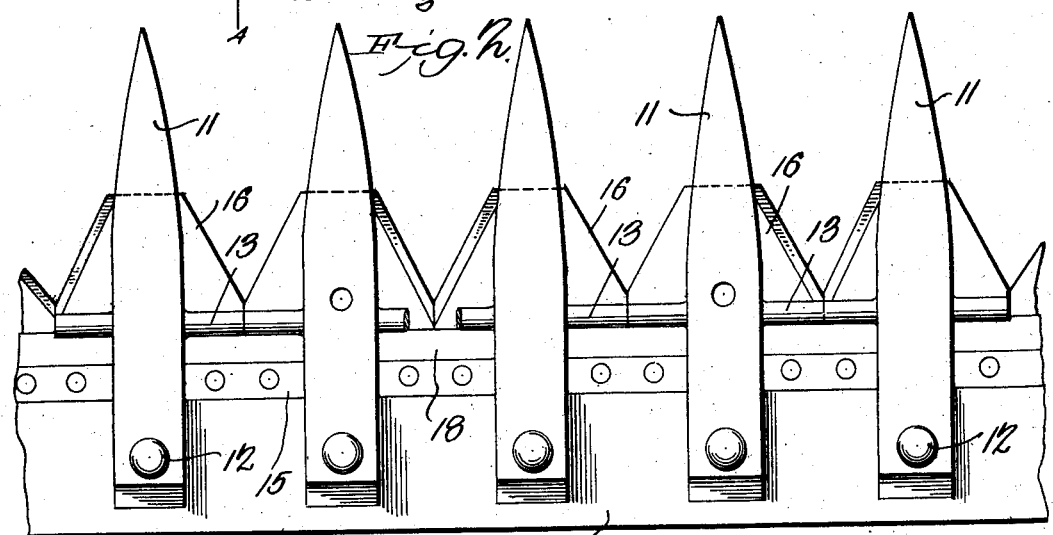
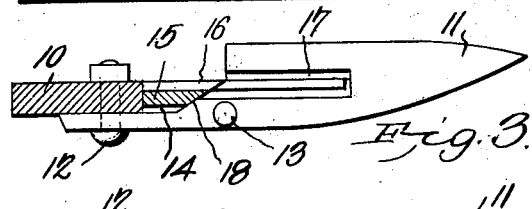
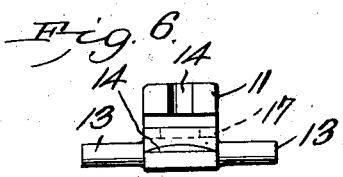
John W. Evans, Inventor.

No. 741,642. Patented October 20, 1903.

UNITED STATES PATENT OFFICE.

JOHN W. EVANS, OF BEATRICE, NEBRASKA.

HARVESTER OR MOWER SICKLE-KNIFE.

SPECIFICATION forming part of Letters Patent No. 741,642, dated October 20, 1903.

Application filed April 9, 1903. Serial No. 151,889. (No model.)

*To all whom it may concern:*

Be it known that I, JOHN W. EVANS, a citizen of the United States, residing at Beatrice, in the county of Gage and State of Nebraska, have invented a new and useful Harvester or Mower Sickle-Knife, of which the following is a specification.

This invention relates to the sickle mechanism of mowing and harvesting and similar machines, and has for its object to improve the construction and action of such devices and to produce a device which will not become clogged or "choked" during operation and which may be readily sharpened when dulled.

Another object of the invention is to produce a device which will operate uniformly at opposite sides of the sickle-bar, whereby the strains are equalized and the tendency to choke or clog minimized.

Other novel features and objects of the invention will appear in the annexed description and be specified in the claims following.

In the drawings illustrative of the invention, in which corresponding parts are denoted by like designating characters, Figure 1 is a top plan view, partially in section, and Fig. 2 is a bottom plan view, of a portion of a cutter-bar and sickle-bar with the improvements applied. Fig. 3 is a transverse section on the line 3 3 of Fig. 1. Fig. 4 is a transverse section on the line 4 4 of Fig. 1. Fig. 5 is an enlarged transverse section of one of the improved sickle-knives. Fig. 6 is a rear elevation of one of the guard-fingers.

The improvement may be applied to any of the various harvesting-machines employing reciprocating sickle-knife sections—such as mowing and reaping machines, harvesters, headers, and the like, and some forms of lawn-mowers—and may be attached to any of the various makes of such machines without material change of structure, and for the purpose of illustration a portion of a sickle-section employed on such machines is shown, 10 representing the finger-bar to whose under side the fingers or guards 11 are bolted, as at 12, at equidistant points in the usual manner. Extending laterally from the sides of the fingers are stop-pins 13, with their adjacent ends in contact and forming mutual supports or stops to prevent lateral movement, and thus resist side strains. The upper surfaces of the fingers adjacent to the bar 10 are convex, as at 14, and the sickle-knife head or bar 15 rests across these convex portions, the latter thus serving as bearings for the bar and reducing the friction between bar and fingers.

The sickle-knives are represented at 16 with their opposite side edges reversely inclined and correspondingly beveled—that is to say, the bevel of each opposite edge being in the same direction, as indicated in Fig. 5, which represents an enlarged transverse section of one of the knives in contradistinction to the ordinary sickle-knife, whose cutting edges are reversely beveled. These sickle-knives, constructed with the edges thereof beveled in the same direction, will when placed in position on the sickle-bar with their bases in contact have each alternate pair of adjacent edges arranged with the beveled edges thereof reversely disposed, whereby each pair of said knives will present their cutting edges in opposite directions. Thus one half of the adjacent edges of the pairs of knives will cut against the upper sides of the apertures in the fingers, and the other half will cut against the lower sides of the apertures. To this end the wear or "ledger" plates represented at 17 will be arranged alternately upon opposite sides of the alternate fingers 11, as shown. In Fig. 3 one of the fingers is shown with the ledger-plate 17 in the upper position, and in Fig. 4 the ledger-plate is shown in the reversed position to correspond to the reversed arrangement of the knives. By this arrangement the strains are uniformly divided between the opposite faces of the sickle-section, obviating all tendency to said strains and materially diminishing the tendency of the knives to become clogged or choked when in action and also materially reducing the power necessary to operate the sickle. The "draft" of the machine is thus very materially decreased, resulting in a lighter-running machine, and consequently one in which the wear and tear is correspondingly reduced.

The sickle-bar 15 is cut away, as at 18, on the lower side, so that the beveled edges of the knives 16 which come upon that side of the bar can be as readily acted upon by the grinding means, such as a grindstone, as the oppositely-disposed knives. This is an important feature of the invention and adds materially to its value and efficiency and obviates the necessity for employing special forms of grinding mechanism for the lower facing series of knives.

The cutting-knives thus formed are no more expensive to manufacture than the ordinary knife, and the cost of manufacture of the other parts is not increased, as no additional parts are employed.

A mower or harvester equipped with the improvement herein described can be operated with less power or more easily operated by the same power than one equipped with ordinarily-constructed cutter-knives. Consequently there will be a material saving not only in the wear and tear of the machine, but also the strains upon the horses employed for hauling it.

It will be noted that as the ledger-plate of each alternate "finger" operates above the sickle-knives the necessity for sickle-holders is obviated, thereby cheapening and lightening the structure to that extent.

Having thus described the invention, what I claim is—

1. In harvesting and mowing machines, the sickle-knives each having reversely-inclined cutting edges with the edges of each knife beveled in the same direction, said knives being connected to the sickle-bar with the beveled edges of each knife reversely disposed relative to the adjacent beveled edges of its companion knives whereby the adjacent edges of said knives face in the same direction.

2. In harvesting and mowing machines, the sickle-knives having reversely-inclined cutting edges with the edges of each knife beveled in the same direction, said knives being connected to the sickle-bar with their bases in contact and the beveled edges of each knife reversely disposed relative to the adjacent beveled edges of its companion knives, each alternate pair of the adjacent beveled edges of said knives facing in the same direction, whereby each pair of said knives will present their cutting edges in opposite directions.

3. In a harvesting and mowing machine, the combination of a finger-bar, spaced guard-fingers connected therewith, a sickle-bar, sickle-knives, each sickle-knife having reversely-inclined cutting edges beveled in the same direction, and connected with the sickle-bar with the beveled edges of each knife reversely disposed relative to the adjacent beveled edges of its companion knives, whereby each alternate pair of said adjacent edges face in the same direction and operate alternately relative to the opposite sides of the guard-finger apertures.

4. In a harvesting and mowing machine, the combination of a finger-bar, spaced guard-fingers connected with said finger-bar and with ledger-plates alternately connected therein upon opposite sides of the knife-apertures, a sickle-bar, sickle-knives, the sickle-knives each having reversely-inclined cutting edges beveled in the same direction, and connected with the sickle-bar with the beveled edges of each knife reversely disposed relative to the adjacent beveled edges of its companion knives, whereby each alternate pair of adjacent cutting edges face in the same direction and operate alternately relative to the opposite sides of the guard-finger apertures.

5. In a harvesting and mowing machine, the combination of a sickle-bar having its outer edge beveled toward the sickle-knives, a finger-bar, spaced guard-fingers attached to said finger-bar, each sickle-knife having reversely-inclined cutting edges beveled in the same direction and attached to the sickle-bar with the beveled edges of each knife reversely disposed relative to the cutting edges of the adjacent knives, each alternate pair of adjacent cutting edges facing in the same direction and operative alternately relative to the opposites sides of the guard-finger apertures.

In testimony that I claim the foregoing as my own I have hereto affixed my signature in the presence of two witnesses.

JOHN W. EVANS.

Witnesses:
J. T. GREENWOOD,
LAFAYETTE NELSON.